UNITED STATES PATENT OFFICE.

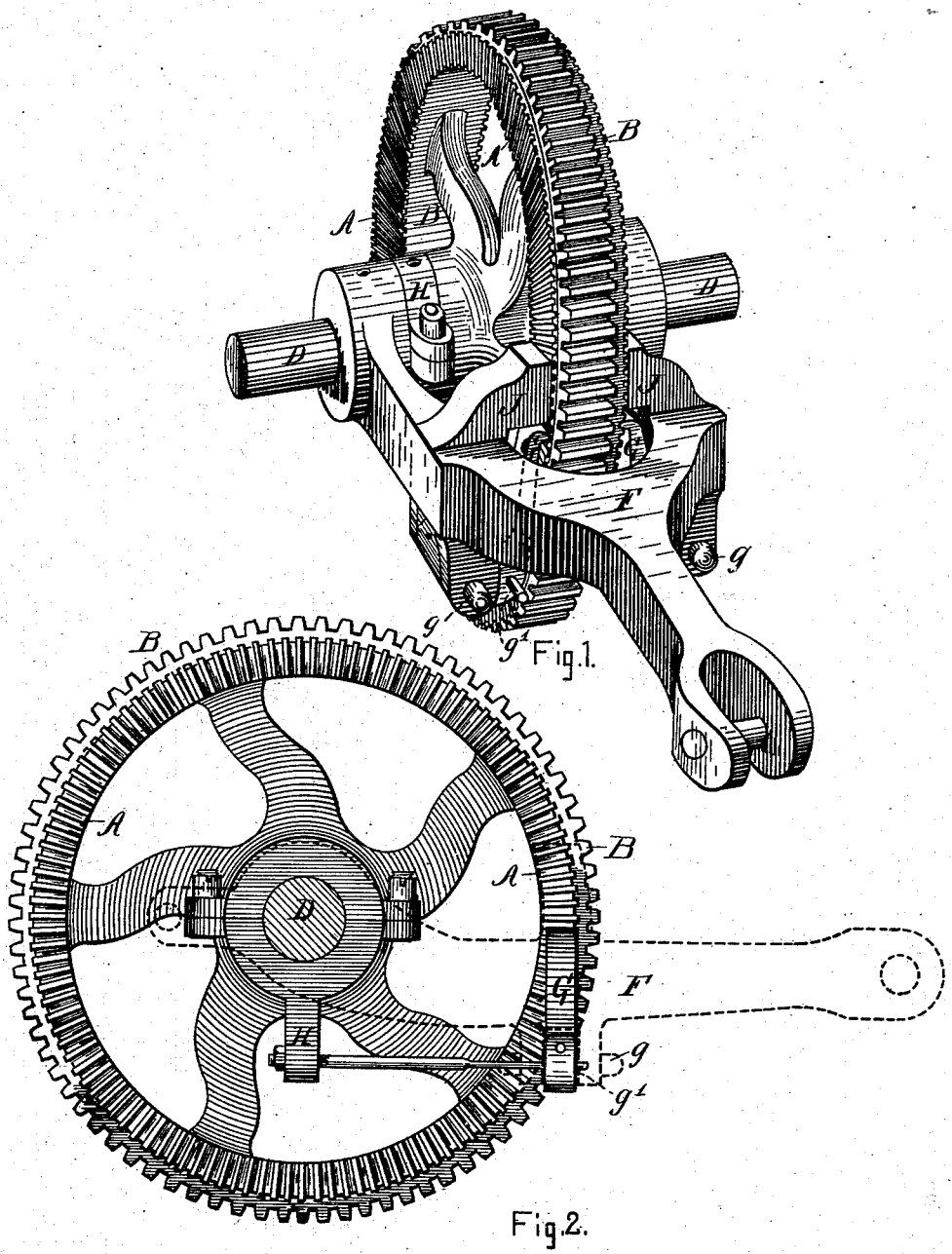

ALANSON T. BREWER, OF WATERTOWN, MASSACHUSETTS.

PAWL-AND-RATCHET MECHANISM.

SPECIFICATION forming part of Letters Patent No. 239,928, dated April 12, 1881.

Application filed March 2, 1881. (No model.)

*To all whom it may concern:*

Be it known that I, ALANSON T. BREWER, of Watertown, in the county of Middlesex and State of Massachusetts, have invented an Improved Pawl-and-Ratchet Mechanism, of which the following is a full, clear, concise, and exact description, reference being had to the accompanying drawings, making a part hereof, in which—

Figure 1 is a perspective view of such parts of a mechanism as are necessary to illustrate my invention. Fig. 2 is a side elevation.

The object of my invention is to insure the prompt motion of the pawl toward the ratchet on the feeding-stroke of the pawl, and its prompt motion away from the ratchet on the back-stroke of the pawl; and my invention consists in the combination, with the pawl, of a friction device arranged to insure the motion of the pawl in its carrier as soon as the carrier is moved.

In the drawings, the ratchet A is shown on the side of the rim of wheel B, and the pawl-carrier F is journaled on arbor D, around which wheel B revolves. In the machine of which Fig. 1 is a part the arbor D is made fast at each end, and the power applied to the pawl-carrier F is transmitted by wheel B to a pinion (not shown) which meshes with wheel B. The pawl G is journaled at $g$ to the pawl-carrier F, and is connected at $g'$ to the friction device H.

The friction device shown is a friction-strap around arbor D, with a finger projecting from it and passing through pawl G at $g'$. This is the simplest and most efficient friction device for this purpose known to me.

The operation is as follows: When the pawl G is out of contact with the ratchet A motion of the pawl-carrier F upward (the device being in the position shown in the drawings) will carry pawl G against the finger of friction device H, and this friction device cannot move until forced to move by the stress of pawl G upon it. The first motion of pawl G is an upward motion and a motion on its journal $g$, its upper end moving inwardly and coming in contact with the ratchet A, the pressure of pawl G upon ratchet A depending upon the amount of friction of the friction device H on arbor D. In brief, the first motion of pawl-carrier F upward causes pawl G to turn on its journal $g$ and take into ratchet A, and the continued motion of pawl-carrier F carries pawl G, friction device H, and ratchet A with it. On the back slider of pawl-carrier F the first back motion of that carrier moves pawl G on its journal $g$ until the outer face of pawl G brings up against the pawl-carrier F, or a stop carried by it, and the continued back motion of the pawl-carrier carries with it pawl G and friction device H, pawl G being held away from ratchet A.

I have shown in the drawings two pawls G, and two ratchets A; but a description of one fully describes both.

A minor feature of my invention consists in clamping the rim of wheel B between pawl G and a shoulder, J, on the pawl-carrier during the feeding stroke of the pawl. This is very desirable where any great power is to be transmitted by the mechanism.

It will be seen that when the pawl takes into the ratchet it tends to throw the rim of wheel B away from it, and if a single pawl were used the rim of wheel B would be moved in practice some considerable fraction of an inch; but when the shoulder J—say on the right of wheel B in Fig. 1—is properly adjusted opposite the engaging-pawl—say the pawl G on the left of wheel B in Fig. 1—then any motion of wheel B under stress of pawl G (on the left in Fig. 1) will clamp wheel B firmly between pawl G on the left of Fig. 1 and shoulder J on the right of Fig. 1, and so of the other pawl and the other shoulder.

The two pawls shown are used instead of only one, so as to lessen the lost motion, and each acts largely independently of the other, they being so set that when one is in—that is, with its toe at the bottom of the space between the teeth of ratchet A—the other rests upon the corner of one of the teeth.

What I claim as my invention is—

1. In combination, ratchet A, pawl G, and friction device H, substantially as described.

2. In combination, pawl-carrier F, formed with a shoulder, J, pawl G, and ratchet A, the pawl G being on one side of the ratchet and the shoulder J on the other side, whereby the ratchet is clamped between pawl G and shoulder J during the feeding stroke of the pawl, as set forth.

A. T. BREWER.

Witnesses:
J. E. MAYNADIER,
JOHN R. SNOW.